United States Patent
Frank et al.

(10) Patent No.: US 12,191,961 B2
(45) Date of Patent: Jan. 7, 2025

(54) TRANSMITTING SIGNALS WITH DELAYS

(71) Applicant: Lenovo (Singapore) Pte. Ltd., New Tech Park (SG)

(72) Inventors: Colin D. Frank, Park Ridge, IL (US); Vijay Nangia, Woodridge, IL (US); Hyejung Jung, Northbrook, IL (US)

(73) Assignee: Lenovo (Singapore) Pte. Ltd., New Tech Park, Singapore (SG)

( * ) Notice: Subject to any disclaimer, the term of this patent is extended or adjusted under 35 U.S.C. 154(b) by 0 days.

(21) Appl. No.: 17/998,896

(22) PCT Filed: May 11, 2021

(86) PCT No.: PCT/IB2021/054019
§ 371 (c)(1),
(2) Date: Nov. 15, 2022

(87) PCT Pub. No.: WO2021/229445
PCT Pub. Date: Nov. 18, 2021

(65) Prior Publication Data
US 2023/0216570 A1    Jul. 6, 2023

Related U.S. Application Data

(60) Provisional application No. 63/025,304, filed on May 15, 2020.

(51) Int. Cl.
*H04B 7/06* (2006.01)
*H04B 7/0404* (2017.01)

(52) U.S. Cl.
CPC ......... *H04B 7/0671* (2013.01); *H04B 7/0404* (2013.01)

(58) Field of Classification Search
CPC ............................ H04B 7/0671; H04B 7/0404
See application file for complete search history.

(56) References Cited

U.S. PATENT DOCUMENTS 9,300,376 B2 * 3/2016 Park ..................... H04B 7/0669
2018/0167252 A1    6/2018 Wang et al.
(Continued)

FOREIGN PATENT DOCUMENTS

WO    2018031124 A1    2/2018

OTHER PUBLICATIONS

PCT/IB2021/054019, "Notification of Transmittal of the International Search report and the Written Opinion of the International Searching Authority, or the Declaration", International Searching Authority, Sep. 17, 2021, pp. 1-20.
(Continued)

*Primary Examiner* — Janice N Tieu
(74) *Attorney, Agent, or Firm* — Kunzler Bean & Adamson

(57) ABSTRACT

Apparatuses, methods, and systems are disclosed for transmitting signals with delays. One method includes determining, at a user equipment, a first transmit signal based on a set of modulation symbols. The method includes determining a second transmit signal based on the first transmit signal, wherein the second transmit signal is a delayed copy of the first transmit signal that is delayed by a delay, and the delay is less than a maximum value. The method includes transmitting the first transmit signal from a first antenna of the user equipment. The method includes transmitting the second transmit signal from a second antenna of the user equipment.

19 Claims, 7 Drawing Sheets

(56) References Cited

U.S. PATENT DOCUMENTS

2020/0127794 A1* 4/2020 Lin .................. H04W 72/04
2020/0205127 A1* 6/2020 Tang ................. H04W 72/20
2021/0051608 A1* 2/2021 Sridharan .......... H04L 25/0226

OTHER PUBLICATIONS

Spreadtrum Comm., "Discussion on Full TX Power for UL transmission", 3GPP TSG RAN WG1 Meeting #95 R1-1813065, Nov. 12-16, 2018, pp. 1-3.
Intel Corp., "eV2X SD-CDD Transmit Diversity requirements", 3GPP TSG-RAN WG4 Meeting #87 R4-1806301, May 21-25, 2018, pp. 1-4.
Intel Corp., "On transparent Tx Diversity", 3GPP TSG-RAN WG4 Meeting #94Bis R4-2003217, Apr. 20-30, 2020, pp. 1-3.
Nortel, "Transmit diversity for PUCCH in LTE-A", 3GPP TSG-RAN WG1#54 R1-083159, Aug. 18-22, 2008, pp. 1-4.

* cited by examiner

400

15000 * delay * 360 = 25.3 degrees for delay = cyclic prefix duration of 4.69 usec

$$15000 * 6.7 \text{ usec} / 2 * 360 = 180 \text{ degrees}$$

$$M \cdot T_s/2^\mu = M \cdot 64 \cdot T_c/2^\mu$$

FIG. 7

TRANSMITTING SIGNALS WITH DELAYS

CROSS-REFERENCE TO RELATED APPLICATIONS

This application claims priority to U.S. Patent Application Ser. No. 63/025,304 entitled "APPARATUSES, METHODS, AND SYSTEMS FOR LIMITATIONS ON TRANSPARENT TRANSMIT DIVERSITY DELAY TO IMPROVE SYSTEM PERFORMANCE" and filed on May 15, 2020 for Colin D. Frank, which is incorporated herein by reference in its entirety.

FIELD

The subject matter disclosed herein relates generally to wireless communications and more particularly relates to transmitting signals with delays.

BACKGROUND

In certain wireless communications networks, duplicate signals may be sent. The duplicate signals may interfere with one another.

BRIEF SUMMARY

Methods for transmitting signals with delays are disclosed. Apparatuses and systems also perform the functions of the methods. One embodiment of a method includes determining, at a user equipment, a first transmit signal based on a set of modulation symbols. In some embodiments, the method includes determining a second transmit signal based on the first transmit signal, wherein the second transmit signal is a delayed copy of the first transmit signal that is delayed by a delay, and the delay is less than a maximum value. In certain embodiments, the method includes transmitting the first transmit signal from a first antenna of the user equipment. In various embodiments, the method includes transmitting the second transmit signal from a second antenna of the user equipment.

One apparatus for transmitting signals with delays includes a processor that: determines a first transmit signal based on a set of modulation symbols; and determines a second transmit signal based on the first transmit signal, wherein the second transmit signal is a delayed copy of the first transmit signal that is delayed by a delay, and the delay is less than a maximum value. In various embodiments, the apparatus includes a transmitter that: transmits the first transmit signal from a first antenna of the user equipment; and transmits the second transmit signal from a second antenna of the user equipment.

Another embodiment of a method for transmitting signals with delays includes indicating, by a network device to a user equipment, to transmit a set of modulation symbols. In some embodiments, the method includes receiving, by the network device, a receive signal comprising a first signal based on the set of modulation symbols from a first antenna of the user equipment, and a second signal from a second antenna of the user equipment, wherein the second signal is based on the first signal, and the second signal is a delayed copy of the first signal that is delayed by a delay, and the delay is less than a maximum value. In certain embodiments, the method includes demodulating, by the network device, the received signal to determine the set of modulation symbols.

Another apparatus for transmitting signals with delays includes a processor that indicates, to a user equipment, to transmit a set of modulation symbols. In various embodiments, the apparatus includes a receiver that receives a receive signal comprising a first signal based on the set of modulation symbols from a first antenna of the user equipment, and a second signal from a second antenna of the user equipment, wherein the second signal is based on the first signal, and the second signal is a delayed copy of the first signal that is delayed by a delay, and the delay is less than a maximum value, wherein the processor demodulates the received signal to determine the set of modulation symbols.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 4 is a diagram illustrating one embodiment of a phase shift formula;

FIG. 5 is a diagram illustrating one embodiment of a formula for computing a number of subcarriers;

FIG. 6 is a diagram illustrating one embodiment of a relative phase rotation formula;

FIG. 7 is a diagram illustrating one embodiment of a delay value formula;

DETAILED DESCRIPTION

Figure 1:
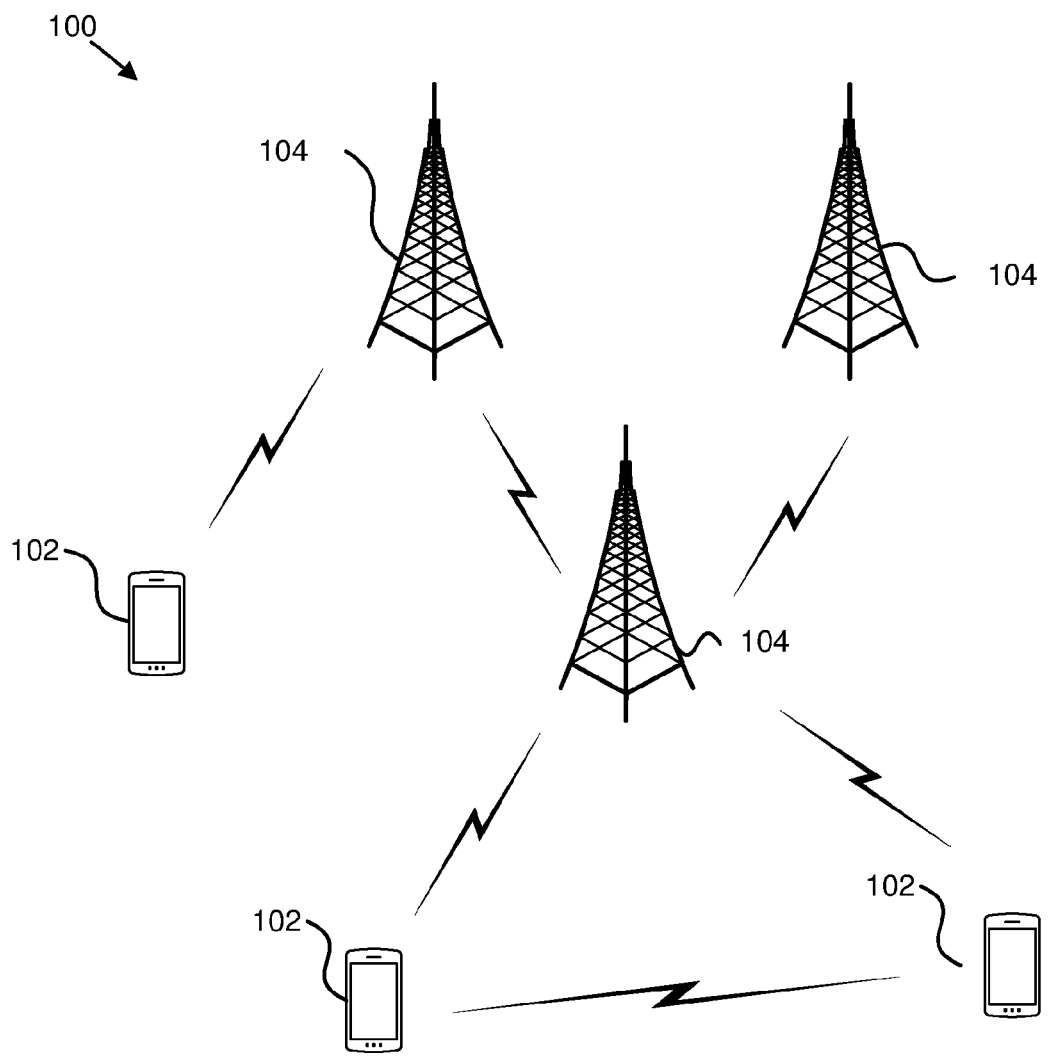
FIG. 1 is a schematic block diagram illustrating one embodiment of a wireless communication system for transmitting signals with delays.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for transmitting signals with delays. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), aerial vehicles, drones, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals. In certain embodiments, the remote units 102 may communicate directly with other remote units 102 via sidelink communication.

The network units 104 may be distributed over a geographic region. In certain embodiments, a network unit 104 may also be referred to and/or may include one or more of an access point, an access terminal, a base, a base station, a location server, a core network ("CN"), a radio network entity, a Node-B, an evolved node-B ("eNB"), a 5G node-B ("gNB"), a Home Node-B, a relay node, a device, a core network, an aerial server, a radio access node, an access point ("AP"), new radio ("NR"), a network entity, an access and mobility management function ("AMF"), a unified data management ("UDM"), a unified data repository ("UDR"), a UDM/UDR, a policy control function ("PCF"), a radio access network ("RAN"), a network slice selection function ("NSSF"), an operations, administration, and management ("OAM"), a session management function ("SMF"), a user plane function ("UPF"), an application function, an authentication server function ("AUSF"), security anchor functionality ("SEAF"), trusted non-3GPP gateway function ("TNGF"), or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with NR protocols standardized in third generation partnership project ("3GPP"), wherein the network unit 104 transmits using an OFDM modulation scheme on the downlink ("DL") and the remote units 102 transmit on the uplink ("UL") using a single-carrier frequency division multiple access ("SC-FDMA") scheme or an orthogonal frequency division multiplexing ("OFDM") scheme. More generally, however, the wireless communication system 100 may implement some other open or proprietary communication protocol, for example, WiMAX, institute of electrical and electronics engineers ("IEEE") 802.11 variants, global system for mobile communications ("GSM"), general packet radio service ("GPRS"), universal mobile telecommunications system ("UMTS"), long term evolution ("LTE") variants, code division multiple access 2000 ("CDMA2000"), Bluetooth®, ZigBee, Sigfoxx, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In various embodiments, a remote unit 102 may determine, at a user equipment, a first transmit signal based on a set of modulation symbols. In some embodiments, the remote unit 102 may determine a second transmit signal based on the first transmit signal, wherein the second transmit signal is a delayed copy of the first transmit signal that is delayed by a delay, and the delay is less than a maximum value. In certain embodiments, the remote unit 102 may transmit the first transmit signal from a first antenna of the user equipment. In various embodiments, the remote unit 102 may transmit the second transmit signal from a second antenna of the user equipment. Accordingly, the remote unit 102 may be used for transmitting signals with delays.

In certain embodiments, a network unit 104 may indicate, by a network device to a user equipment, to transmit a set of modulation symbols. In some embodiments, the network unit 104 may receive, by the network device, a receive signal comprising a first signal based on the set of modulation symbols from a first antenna of the user equipment, and a second signal from a second antenna of the user equipment, wherein the second signal is based on the first signal, and the second signal is a delayed copy of the first signal that is delayed by a delay, and the delay is less than a maximum value. In certain embodiments, the network unit 104 may demodulate, by the network device, the received signal to determine the set of modulation symbols. Accordingly, the network unit 104 may be used for receiving signals with delays.

Figure 2:
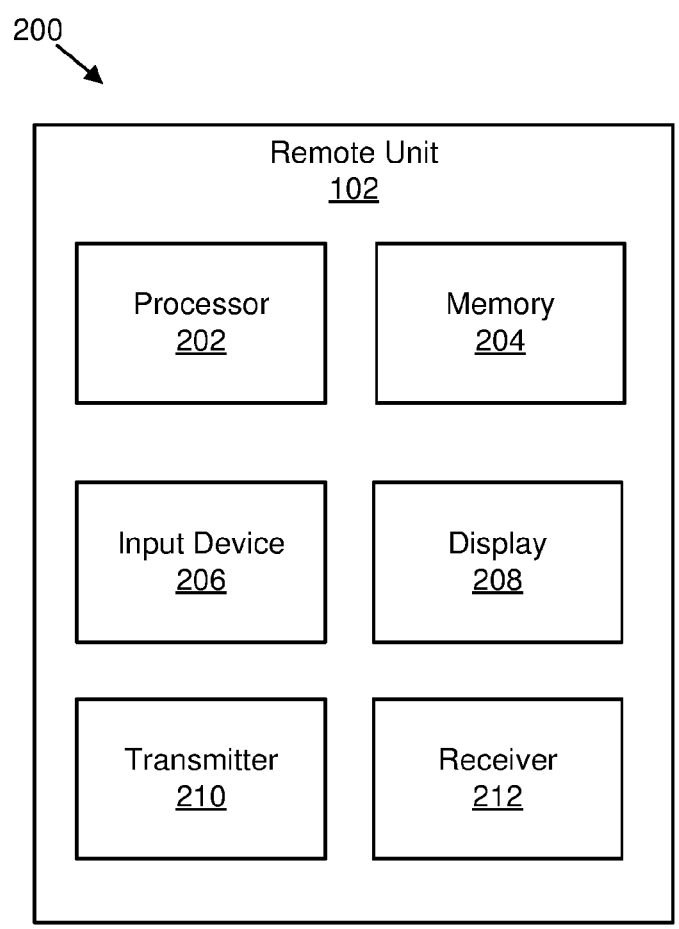
FIG. 2 is a schematic block diagram illustrating one embodiment of an apparatus that may be used for transmitting signals with delays.

FIG. 2 depicts one embodiment of an apparatus 200 that may be used for transmitting signals with delays. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, a liquid crystal display ("LCD"), a light emitting diode ("LED") display, an organic light emitting diode ("OLED") display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The processor 202 may: determine a first transmit signal based on a set of modulation symbols; and determine a second transmit signal based on the first transmit signal, wherein the second transmit signal is a delayed copy of the first transmit signal that is delayed by a delay, and the delay is less than a maximum value. In various embodiments, the transmitter 210 may: transmit the first transmit signal from a first antenna of the user equipment; and transmit the second transmit signal from a second antenna of the user equipment.

Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
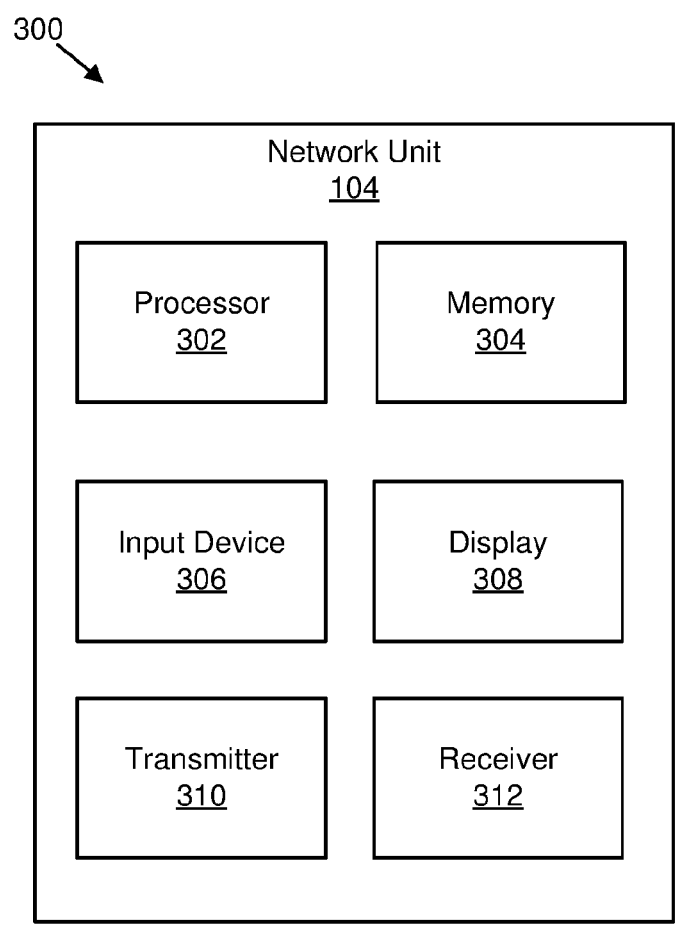
FIG. 3 is a schematic block diagram illustrating one embodiment of an apparatus that may be used for transmitting signals with delays.

FIG. 3 depicts one embodiment of an apparatus 300 that may be used for transmitting signals with delays. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In certain embodiments, the processor 302 may indicate, to a user equipment, to transmit a set of modulation symbols. In various embodiments, the receiver 312 may receive a receive signal comprising a first signal based on the set of modulation symbols from a first antenna of the user equipment, and a second signal from a second antenna of the user equipment, wherein the second signal is based on the first signal, and the second signal is a delayed copy of the first signal that is delayed by a delay, and the delay is less than a maximum value, wherein the processor 302 demodulates the received signal to determine the set of modulation symbols.

In some embodiments, transparent transmit diversity may be used by a user equipment ("UE"). In various embodiments, transparent transmit diversity methods may include:

cyclic delay diversity ("CDD")—the delay is less than a cyclic prefix; linear delay—the delay should be small to avoid reducing an ability of the cyclic prefix to contain a channel multipath; and/or any rank one precoder.

In certain embodiments, cyclic or linear delay diversity may have several advantages relative to single antenna transmissions, such as: it may significantly improve link performance on a flat fading channel; it may enable a UE to transmit more power by using two power amplifiers ("PAs")— one for each antenna—thus, the UE may achieve a given power class with X dBm by using two PAs with each power amplifier ("PA") having a power of X-3 dBm—it may be less expensive to use two PAs having one-half the power of the desired power class; and/or there may be no need for additional reference symbols—that is, the same reference symbols may be transmitted from both antennas in the same time and/or frequency resource element.

In various embodiments, linear delay may have similar advantages to CDD, with the exception that there may be a slight reduction in the ability to tolerate multipath depending on the delay that is used. In such embodiments, a rank one precoder may enable a UE to transmit more power and use existing reference symbols. However, whether a rank one precoder improves link performance may depend on a direction in which a resulting beam is pointing. To be beneficial, a rank one precoder may be randomized in some way (e.g., across frequency or time). Moreover, the UE may select a precoder that points in the direction of a gNB using channel reciprocity.

In some embodiments, low-delay CDD may be used for transparent transmit diversity. With this form of diversity, a cyclic delay may be applied to a signal transmitted from a second antenna. The symbol from the second antenna may be delayed by a time interval less than a symbol duration, after which a portion of the symbol that falls outside of the symbol interval is added to the start of the symbol. Thus, with a cyclic delay, symbol boundaries may be preserved. The effect of this delay is to add a frequency dependent phase rotation to the second signal relative to the first signal. Depending on the delay applied to the second antenna, the phase rotation may be very large.

In certain embodiments, a normal cyclic prefix may be used with a subcarrier spacing of 15 kHz. For the first and eighth symbols in a slot and/or subframe (e.g., for 15 kHz subcarrier spacing there is one slot per subframe), the symbol duration is 71.9 usec and the cyclic prefix is 5.21 usec. For the remaining symbols, the symbol duration is 71.4 usec and the cyclic prefix is 4.69 usec. Relative to the first antenna, the phase shift (in degrees) from one subcarrier to the next is given as shown in FIG. 4. Specifically, FIG. 4 is a diagram illustrating one embodiment of a phase shift formula 400 (e.g., 15000*delay*360=25.3 degrees for delay=cyclic prefix duration of 4.69 usec), and the relative phase between the two antennas changes from in-phase to out-of-phase in approximately 7 subcarriers as shown in FIG. 5. Specifically, FIG. 5 is a diagram illustrating one embodiment of a formula for computing a number of subcarriers 500 (e.g., 180/25.3=7.1).

However, in such embodiments, since this is transparent transmit diversity, a UE is not required to limit a cyclic delay to a length of the cyclic prefix. For example, if the cyclic delay is equal to one-half of a symbol duration (excluding cyclic prefix, e.g., 1/(2*subcarrier-spacing)), then a relative phase rotation from one subcarrier to the next is shown in FIG. 6. Specifically, FIG. 6 is a diagram illustrating one embodiment of a relative phase rotation formula 600 (e.g., 15000*6.7 usec/2*360=180 degrees). So, without any limitation on the cyclic delay, the relative phase between the two antennas may change from in-phase to out-of-phase within one subcarrier. Thus, there may be a limitation on the cyclic delay or else a channel estimation at a gNB may fail. Furthermore, even if the delay is limited, it may be beneficial for the gNB to know the value of the cyclic delay, or a range of values for the cyclic delay, to enable the gNB to better estimate the channel.

In various embodiments, given that a value of a cyclic delay is to be limited, the value may be measured by test equipment. This may be done by simultaneously demodulating an output of both UE antennas, and determining change of a relative phase of fast Fourier transform ("FFT") outputs across a frequency. The rate of the change of the relative phase uniquely may determine the cyclic delay as long as the delay is less than one-half a symbol duration (e.g., excluding cyclic prefix). For example, if $X_1(k)$ and $X_2(k)$ are the FFT outputs of the two antennas, the cyclic delay may be estimated based on an average angle and/or phase of $Y(k)Y^*(k-1)$ across a frequency where $Y(k)=X_1(k)X^*_2(k)$.

In some embodiments, for a linear non-CDD delay, the delay used for a second antenna may be much less than a cyclic prefix. However, a maximum value of this delay may be specified because it may affect channel estimation at a gNB and an ability of a signal to tolerate multipath transmission without resulting in inter-carrier interference.

In certain embodiments, a gNB may perform channel estimation to demodulate a received signal. In such embodiments, the gNB may estimate a delay spread of a channel and use this estimate to determine a correlation of a received signal across frequencies. In various embodiments, a gNB may have multiple sets of channel estimation parameters that it uses in parallel to see which parameter produces the best channel estimate. With transparent diversity, at least one component of frequency decorrelation of the channel may be produced by a transmitter and not the channel. If the gNB receiver is aware of the delay, then the delay may be incorporated into the channel estimation algorithm.

In some embodiments, a delay, cyclic or linear, used by a UE for transmit diversity may be limited to less than a certain value to avoid degrading channel estimation at a gNB. At a minimum, the excess delay observed using any transparent virtualization scheme may not be more than a length and/or duration of a cyclic prefix larger than a smallest excess delay from the transmissions on any one of the transmit ("TX") chains with fixed receiver timing. In such embodiments, the excess delay may not be more than X us (e.g., X=0.25 us) with X us being much smaller the cyclic prefix duration. In various embodiments, an excess delay is a cyclic or circular excess delay, such as if the delay is negative (e.g., representing a cyclic advance).

In certain embodiments, given that a value of a cyclic delay is limited, the value may be measured by test equipment. This may be done by simultaneously demodulating an output of both UE antennas, and determining a relative phase of FFT outputs across frequencies. A rate of change of the relative phase may uniquely determine the cyclic delay as long as the delay is less than one-half a symbol duration (e.g., excluding cyclic prefix).

In some embodiments, if a UE transmits a physical uplink shared channel ("PUSCH") transmission with repetition (e.g., repetition type A or type B), the UE transmits one subset of PUSCH repetitions and corresponding demodulation ("DM") reference signal ("RS") without transmit diversity (e.g., transmission from TX antenna 1) and another subset of PUSCH repetitions and corresponding DM RS with transmit diversity (e.g., transmission from TX antenna 1 and from TX antenna 2 with delay). A gNB or test equipment may estimate channels without transmit diversity, H1, (e.g., channel of TX antenna 1) and composite channels, Hc, resulting from transmit diversity (e.g., composite channel of TX antenna 1 and delayed TX antenna 2), and may estimate delay employed by the UE based on H1 and Hc. In one embodiment, a UE may alternate PUSCH repetition without and with transmit diversity (e.g., the UE transmits the first PUSCH repetition without transmit diversity, the second PUSCH repetition with transmit diversity, and the third PUSCH repetition without transmit diversity, and so on).

In various embodiments, a value of a delay, cyclic or linear, may be reported to a gNB so that the value may be used for estimating a channel. For example, a channel estimation process may be broken into two parts. A first part may estimate a fading due to the channel, and a second part may estimate the fading due to delay diversity.

FIG. 7 is a diagram illustrating one embodiment of a delay value formula 700. In one embodiment, a delay value may be indicated and/or reported to a gNB in multiples of $M \cdot T_s/2^\mu = M \cdot 64 \cdot T_c/2^\mu$ where M is an integer. The time unit $T_c = 1/(\Delta f_{max} \cdot N_f)$, where $\Delta f_{max} = 480 \cdot 10^3$ Hz and $N_f = 4096$. The constant $\kappa = T_s/T_c = 64$, where $T_s = 1/(\Delta f_{ref} \cdot N_{f,ref}) = 15 \cdot 10^3$ Hz and $N_{f,ref} = 2048$, and $\mu$ is a parameter that is related to the subcarrier spacing of the uplink $\Delta f = 2^\mu \cdot 15$ [kHz]. In some embodiments, M=16 or M=8. In certain embodiments, a delay may be indicated by an N-bit sequence indicating index values of $N_d = 0, 1, 2, \ldots 2^N - 1$, where an amount of time delay with sub-carrier spacing ("SCS") of $2^\mu \cdot 15$ kHz is $T_d = N_d \cdot M \cdot T_s/2^\mu = N_d \cdot M \cdot 64 \cdot T_c/2^\mu$.

In various embodiments, a delay value a UE reports to a gNB may be a maximum delay value. If a delay is not used for a transmission on a second antenna (e.g., if a rank one precoder is used), or if the delay value is not signaled, the gNB may assume the value of the delay is 0.

In some embodiments, for a UE using delay to implement transparent transmit diversity, the UE may use a delay value signaled by a gNB. In one embodiment, the delay value may be indicated to a UE in multiples of $M \cdot T_s/2^\mu = M \cdot 64 \cdot T_c/2^\mu$, where M is an integer (e.g., M=16 or M=8). In certain embodiments, a delay may be indicated by an N-bit sequence indicating index values of $N_d = 0, 1, 2, \ldots 2^N - 1$, where an amount of the time delay with SCS of $2^\mu \cdot 15$ kHz is $T_d = N_d \cdot M \cdot T_s/2^\mu = N_d \cdot M \cdot 64 \cdot T_c/2^\mu$. In various embodiments, a delay value indicated to a UE by a gNB may be a maximum delay value. The UE may use any delay value up to the maximum delay value.

In certain embodiments, a delay value a UE may indicate to a gNB and/or a network may be made as part of UE capability signaling. In one example, a UE may indicate a single delay value or a range of delay values as part of UE capability information. In such embodiments, the gNB may indicate to the UE to use a supported delay value (e.g., out of multiple supported delay values). In one example, the delay value $T_d$ may be the delay between any two consecutive antenna indices. For example, the delay values to apply for each of 4 antennas may be 0, $T_d$, $2T_d$, $3T_d$. In another example, the delay value $T_d$ may be the delay between first and last antenna indices. In such an example, the delay values to apply for each of 4 antennas may be 0, $T_d/3$, $2T_d/3$, $T_d$.

In various embodiments, a UE may indicate to a gNB that it may use a transparent transmit diversity and/or virtualization scheme (e.g., one or more embodiments described herein) for single port uplink transmission if the UE is not configured with a higher layer parameter (e.g., txConfig). In such embodiments, the higher layer parameter may indicate whether the UE uses codebook based or non-codebook based transmission. This may be because the UE does not have a single PA with a power rating to achieve a given power class (e.g., for a power class of 26 dBm, the UE may use more than one PA (and antenna) e.g., two PAs each of power rating 23 dBm with two transmit antennas or four PAs each of power rating 20 dBm with four transmit antennas). In one example, a UE may use one PA and/or transmit antenna (or generally a subset of the PA and/or antennas needed to achieve the power class) if the transmit power requirements are below the power rating of one PA (or a subset of the PAs). The UE may use more than one PA and/or transmit antenna (or a subset of the PAs) with transparent transmit diversity and/or virtualization if the transmit power requirements are above the power rating of one PA (or a subset of the PAs). In another example, the UE may always use transparent transmit diversity and/or virtualization (e.g., among PAs and/or antennas needed to achieve a power class) irrespective of transmit power requirements (e.g., for all uplink ("UL") transmissions). In some examples, the UE may be required (e.g., by specification or indication by gNB) to use transparent transmit diversity and/or virtualization (e.g., among the PAs and/or antennas needed to achieve the power class) irrespective of the transmit power requirements for at least a subset of the UL transmissions. For example, for sounding reference signals ("SRSs") and PUSCH transmissions if the sounding reference signal ("SRS") is used for frequency-selective scheduling of PUSCH transmissions or for SRS transmissions if used for downlink channel state information ("CSI") acquisition. In some examples, the UE may use different transparent transmit diversity and/or virtualization schemes for physical uplink control channel ("PUCCH") transmissions and/or physical random access channel ("PRACH") transmissions.

Figure 8:
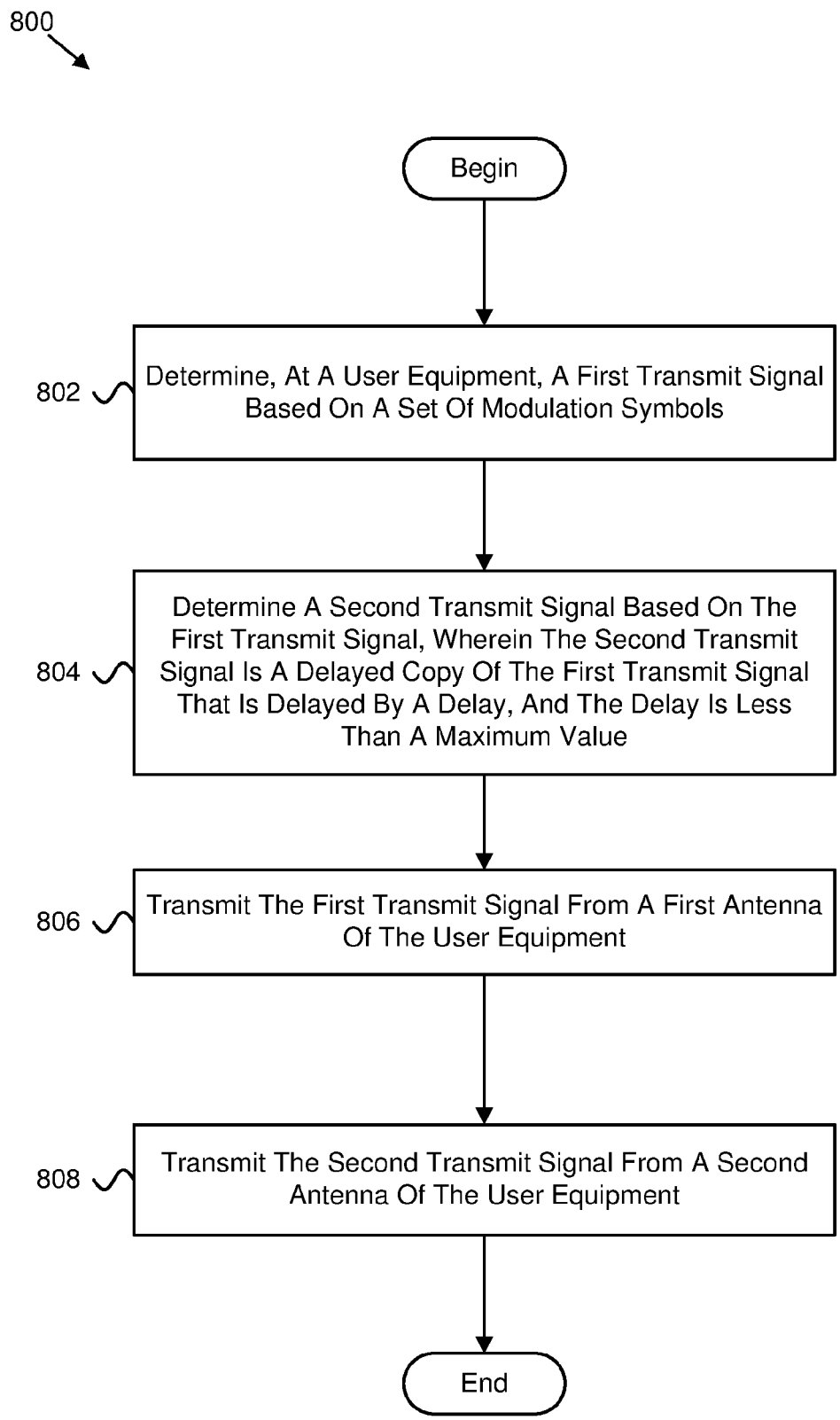
FIG. 8 is a flow chart diagram illustrating one embodiment of a method for transmitting signals with delays.

FIG. 8 is a flow chart diagram illustrating one embodiment of a method 800 for transmitting signals with delays. In some embodiments, the method 800 is performed by an apparatus, such as the remote unit 102. In certain embodiments, the method 800 may be performed by a processor executing program code, for example, a microcontroller, a microprocessor, a CPU, a GPU, an auxiliary processing unit, a FPGA, or the like.

In various embodiments, the method 800 includes determining 802, at a user equipment, a first transmit signal based on a set of modulation symbols. In some embodiments, the method 800 includes determining 804 a second transmit signal based on the first transmit signal, wherein the second transmit signal is a delayed copy of the first transmit signal that is delayed by a delay, and the delay is less than a maximum value. In certain embodiments, the method 800 includes transmitting 806 the first transmit signal from a first antenna of the user equipment. In various embodiments, the method 800 includes transmitting 808 the second transmit signal from a second antenna of the user equipment.

In certain embodiments, the delay is a cyclic delay. In some embodiments, the second transmit signal is delayed without cyclic extension. In various embodiments, the delay is limited to a length of a cyclic prefix.

In one embodiment, the delay is limited to 0.25 microseconds. In certain embodiments, the user equipment indicates the delay used to a network device. In some embodiments, the indicated delay is $M \cdot T_s/2^\mu = M \cdot 64 \cdot T_c/2^\mu$, M is an integer, the time unit $T_c = 1/(\Delta f_{max} \cdot N_f)$, $\Delta f_{max} = 480 \cdot 10^3$ Hz, $N_f = 4096$, the constant $\kappa = T_s/T_c = 64$, $T_s = 1/(\Delta f_{ref} \cdot N_{f,ref})$, $\Delta f_{ref}=15\cdot10^3$ Hz, $N_{f,ref}=2048$, and $\mu$ is a parameter that is related to the subcarrier spacing of the uplink given by $\Delta f=2^\mu\cdot15$ [kHz].

In various embodiments, a value of the delay to be used by the user equipment is received from a network device. In one embodiment, the value of the maximum delay to be used by the user equipment is received from a network device. In certain embodiments, the first antenna is associated with a first power amplifier having a first power rating and the second antenna is associated with a second power amplifier having a second power rating, and the first power rating, the second power rating, or a combination thereof is less than a maximum output power for a user equipment power class. In some embodiments, the transmission of the first transmit signal and the transmission of the second transmit signal are single antenna port transmissions.

Figure 9:
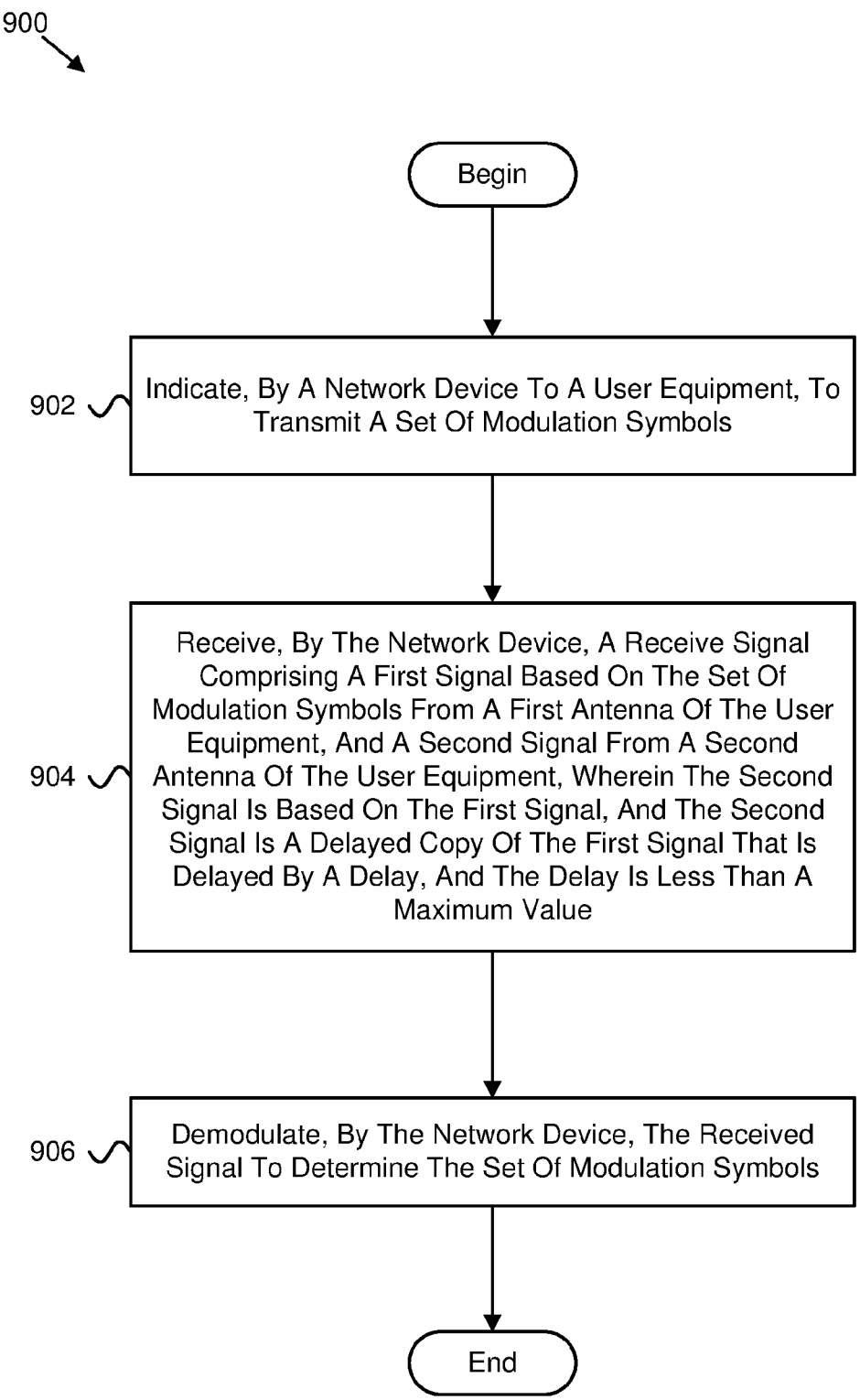
FIG. 9 is a flow chart diagram illustrating one embodiment of a method for receiving signals with delays.

FIG. 9 is a flow chart diagram illustrating one embodiment of a method 900 for receiving signals with delays. In some embodiments, the method 900 is performed by an apparatus, such as the network unit 104. In certain embodiments, the method 900 may be performed by a processor executing program code, for example, a microcontroller, a microprocessor, a CPU, a GPU, an auxiliary processing unit, a FPGA, or the like.

In various embodiments, the method 900 includes indicating 902, by a network device to a user equipment, to transmit a set of modulation symbols. In some embodiments, the method 900 includes receiving 904, by the network device, a receive signal comprising a first signal based on the set of modulation symbols from a first antenna of the user equipment, and a second signal from a second antenna of the user equipment, wherein the second signal is based on the first signal, and the second signal is a delayed copy of the first signal that is delayed by a delay, and the delay is less than a maximum value. In certain embodiments, the method 900 includes demodulating 906, by the network device, the received signal to determine the set of modulation symbols.

In certain embodiments, the method 900 further comprises receiving an indication of the delay used from the user equipment. In some embodiments, the method 900 further comprises indicating the maximum value to the user equipment. In various embodiments, the method 900 further comprises indicating a value of the delay to be used by the user equipment.

In one embodiment, the delay is a cyclic delay. In certain embodiments, the second receive signal is delayed without cyclic extension. In some embodiments, the delay is limited to a length of a cyclic prefix.

In various embodiments, the delay is limited to 0.25 microseconds. In one embodiment, the first antenna is associated with a first power amplifier having a first power rating and the second antenna is associated with a second power amplifier having a second power rating, and the first power rating, the second power rating, or a combination thereof is less than a maximum output power for a user equipment power class.

In one embodiment, a method comprises: determining, at a user equipment, a first transmit signal based on a set of modulation symbols; determining a second transmit signal based on the first transmit signal, wherein the second transmit signal is a delayed copy of the first transmit signal that is delayed by a delay, and the delay is less than a maximum value; transmitting the first transmit signal from a first antenna of the user equipment; and transmitting the second transmit signal from a second antenna of the user equipment.

In certain embodiments, the delay is a cyclic delay.

In some embodiments, the second transmit signal is delayed without cyclic extension.

In various embodiments, the delay is limited to a length of a cyclic prefix.

In one embodiment, the delay is limited to 0.25 microseconds.

In certain embodiments, the user equipment indicates the delay used to a network device.

In some embodiments, the indicated delay is $M\cdot T_s/2^\mu=M\cdot64\cdot T_c/2^\mu$, M is an integer, the time unit $T_c=1/(\Delta f_{max}\cdot N_f)$, $\Delta f_{max}=480\cdot10^3$ Hz, $N_f=4096$, the constant $\kappa=T_s/T_c=64$, $T_s=1/(\Delta f_{ref}\cdot N_{f,ref})$, $\Delta f_{ref}=15\cdot10^3$ Hz, $N_{f,ref}=2048$, and $\mu$ is a parameter that is related to the subcarrier spacing of the uplink given by $\Delta f=2^\mu\cdot15$ [kHz].

In various embodiments, a value of the delay to be used by the user equipment is received from a network device.

In one embodiment, the value of the maximum delay to be used by the user equipment is received from a network device.

In certain embodiments, the first antenna is associated with a first power amplifier having a first power rating and the second antenna is associated with a second power amplifier having a second power rating, and the first power rating, the second power rating, or a combination thereof is less than a maximum output power for a user equipment power class.

In some embodiments, the transmission of the first transmit signal and the transmission of the second transmit signal are single antenna port transmissions.

In one embodiment, an apparatus comprises a user equipment, the apparatus further comprises: a processor that: determines a first transmit signal based on a set of modulation symbols; and determines a second transmit signal based on the first transmit signal, wherein the second transmit signal is a delayed copy of the first transmit signal that is delayed by a delay, and the delay is less than a maximum value; and a transmitter that: transmits the first transmit signal from a first antenna of the user equipment; and transmits the second transmit signal from a second antenna of the user equipment.

In certain embodiments, the delay is a cyclic delay.

In some embodiments, the second transmit signal is delayed without cyclic extension.

In various embodiments, the delay is limited to a length of a cyclic prefix.

In one embodiment, the delay is limited to 0.25 microseconds.

In certain embodiments, the user equipment indicates the delay used to a network device.

In some embodiments, the indicated delay is $M\cdot T_s/2^\mu=M\cdot64\cdot T_c/2^\mu$, M is an integer, the time unit $T_c=1/(\Delta f_{max}\cdot N_f)$, $\Delta f_{max}=480\cdot10^3$ Hz, $N_f=4096$, the constant $\kappa=T_s/T_c=64$, $T_s=1/(\Delta f_{ref}\cdot N_{f,ref})$, $\Delta f_{ref}=15\cdot10^3$ Hz, $N_{f,ref}=2048$, and $\mu$ is a parameter that is related to the subcarrier spacing of the uplink given by $\Delta f=2^\mu\cdot15$ [kHz].

In various embodiments, a value of the delay to be used by the user equipment is received from a network device.

In one embodiment, the value of the maximum delay to be used by the user equipment is received from a network device.

In certain embodiments, the first antenna is associated with a first power amplifier having a first power rating and the second antenna is associated with a second power amplifier having a second power rating, and the first power rating, the second power rating, or a combination thereof is less than a maximum output power for a user equipment power class.

In some embodiments, the transmission of the first transmit signal and the transmission of the second transmit signal are single antenna port transmissions.

In one embodiment, a method comprises: indicating, by a network device to a user equipment, to transmit a set of modulation symbols; receiving, by the network device, a receive signal comprising a first signal based on the set of modulation symbols from a first antenna of the user equipment, and a second signal from a second antenna of the user equipment, wherein the second signal is based on the first signal, and the second signal is a delayed copy of the first signal that is delayed by a delay, and the delay is less than a maximum value; and demodulating, by the network device, the received signal to determine the set of modulation symbols.

In certain embodiments, the method further comprises receiving an indication of the delay used from the user equipment.

In some embodiments, the method further comprises indicating the maximum value to the user equipment.

In various embodiments, the method further comprises indicating a value of the delay to be used by the user equipment.

In one embodiment, the delay is a cyclic delay.

In certain embodiments, the second receive signal is delayed without cyclic extension.

In some embodiments, the delay is limited to a length of a cyclic prefix.

In various embodiments, the delay is limited to 0.25 microseconds.

In one embodiment, the first antenna is associated with a first power amplifier having a first power rating and the second antenna is associated with a second power amplifier having a second power rating, and the first power rating, the second power rating, or a combination thereof is less than a maximum output power for a user equipment power class.

In one embodiment, an apparatus comprises a network device, the apparatus further comprises: a processor that indicates, to a user equipment, to transmit a set of modulation symbols; and a receiver that receives a receive signal comprising a first signal based on the set of modulation symbols from a first antenna of the user equipment, and a second signal from a second antenna of the user equipment, wherein the second signal is based on the first signal, and the second signal is a delayed copy of the first signal that is delayed by a delay, and the delay is less than a maximum value; wherein the processor demodulates the received signal to determine the set of modulation symbols.

In certain embodiments, the receiver receives an indication of the delay used from the user equipment.

In some embodiments, the processor indicates the maximum value to the user equipment.

In various embodiments, the processor indicates a value of the delay to be used by the user equipment.

In one embodiment, the delay is a cyclic delay.

In certain embodiments, the second receive signal is delayed without cyclic extension.

In some embodiments, the delay is limited to a length of a cyclic prefix.

In various embodiments, the delay is limited to 0.25 microseconds.

In one embodiment, the first antenna is associated with a first power amplifier having a first power rating and the second antenna is associated with a second power amplifier having a second power rating, and the first power rating, the second power rating, or a combination thereof is less than a maximum output power for a user equipment power class.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method performed by a user equipment (UE), the method comprising:
    determining a first transmit signal based on a set of modulation symbols;
    determining a second transmit signal based on the first transmit signal, wherein the second transmit signal is a delayed copy of the first transmit signal that is delayed by a delay, and the delay is less than a maximum value;
    transmitting, to a network device, the first transmit signal from a first antenna of the UE;
    transmitting, to the network device, the second transmit signal from a second antenna of the UE; and
    transmitting information indicating the delay to the network device.

2. The method of claim 1, wherein the delay is a cyclic delay.

3. The method of claim 1, wherein the second transmit signal is delayed without cyclic extension.

4. The method of claim 1, wherein the delay is limited to a length of a cyclic prefix.

5. The method of claim 1, wherein the delay is limited to 0.25 microseconds.

6. The method of claim 1, wherein the indicated delay is $M \cdot T_s/2^\mu = M \cdot 64 \cdot T_c/2^\mu$, M is an integer, a time unit $T_c = 1/(\Delta f_{max} \cdot N_f)$, $\Delta f_{max} = 480 \cdot 10^3$ Hz, $N_f = 4096$, a constant $\kappa = T_s/T_c = 64$, $T_s = 1/(\Delta f_{ref} \cdot N_{f,ref})$, $\Delta f_{ref} = 15 \cdot 10^3$ Hz, $N_{f,ref} = 2048$, and μ is a parameter that is related to a subcarrier spacing of an uplink given by $\Delta f = 2^\mu \cdot 15$ [kHz].

7. The method of claim 1, wherein a value of the delay to be used by the UE is received from the network device.

8. The method of claim 1, wherein a value of a maximum delay to be used by the UE is received from the network device.

9. The method of claim 1, wherein the first antenna is associated with a first power amplifier having a first power rating and the second antenna is associated with a second power amplifier having a second power rating, and the first power rating, the second power rating, or a combination thereof is less than a maximum output power for a UE power class.

10. The method of claim 1, wherein the first transmit signal and the second transmit signal correspond to a single antenna port transmissions.

11. A user equipment (UE), comprising:
    at least one memory; and
    at least one processor coupled with the at least one memory and configured to cause the UE to:
        determine a first transmit signal based on a set of modulation symbols;
        determine a second transmit signal based on the first transmit signal, wherein the second transmit signal is a delayed copy of the first transmit signal that is delayed by a delay, and the delay is less than a maximum value;
        transmit, to a network device, the first transmit signal from a first antenna of the UE;
        transmit, to the network device, the second transmit signal from a second antenna of the UE; and transmit information indicating the delay to the network device.

12. The UE of claim 11, wherein the delay is a cyclic delay.

13. An apparatus for performing a network function, the apparatus comprising:
    at least one memory; and
    at least one processor coupled with the at least one memory and configured to cause the apparatus to:
        indicate, to a user equipment (UE), to transmit a set of modulation symbols;
        receive, from the UE, a receive signal comprising a first signal based on the set of modulation symbols, and a second signal from a second antenna of the user equipment, wherein the second signal is based on the first signal, and the second signal is a delayed copy of the first signal that is delayed by a delay, and the delay is less than a maximum value;
        receive, from the UE, information indicating the delay; and
        demodulate the received signal to determine the set of modulation symbols.

14. The apparatus of claim 13, wherein the at least one processor indicates is configured to cause the apparatus to indicate the maximum value to the UE.

15. The apparatus of claim 13, wherein the at least one processor is configured to cause the apparatus to indicate a value of the delay to be used by the UE.

16. The apparatus of claim 13, wherein the delay:
    is a cyclic delay;
    is limited to a length of a cyclic prefix;
    is limited to 0.25 microseconds;
    or a combination thereof.

17. The apparatus of claim 13, wherein the second signal is delayed without cyclic extension.

18. The apparatus of claim 13, wherein the first antenna is associated with a first power amplifier having a first power rating and the second antenna is associated with a second power amplifier having a second power rating, and the first power rating, the second power rating, or a combination thereof is less than a maximum output power for a UE power class.

19. A method performed by a network function, the method comprising:
    indicating, to a user equipment (UE), to transmit a set of modulation symbols;
    receiving, from the UE, a receive signal comprising a first signal based on the set of modulation symbols, and a second signal, wherein the second signal is based on the first signal, and the second signal is a delayed copy of the first signal that is delayed by a delay, and the delay is less than a maximum value;
    receiving, from the UE, information indicating the delay; and
    demodulating the received signal to determine the set of modulation symbols.

* * * * *